Jan. 7, 1969    O. L. ROBINSON    3,420,549
TRAILER HITCH-GUIDE AND GUARD
Filed Jan. 11, 1967

INVENTOR
ORVAL L. ROBINSON

BY
Barnes, Kisselle, Raisch & Choate
ATTORNEYS

United States Patent Office 3,420,549
Patented Jan. 7, 1969

3,420,549
TRAILER HITCH-GUIDE AND GUARD
Orval L. Robinson, 5285 Pointe Tremble S.,
Algonac, Mich. 48001
Filed Jan. 11, 1967, Ser. No. 608,603
U.S. Cl. 280—477     8 Claims
Int. Cl. B60d *1/06;* B60d *1/12*

ABSTRACT OF THE DISCLOSURE

A trailer hitch mounted at the rear of a vehicle including a pivot member and a pair of movable guard and guide members that are mounted for movement and locking at a first position wherein a portion of each member extends at an angle to the rear of the vehicle and provides a guiding surface for guiding the tongue of a trailer tongue toward the pivot member and a second position wherein the guiding surfaces extend in a direction generally parallel to the rear of the vehicle.

---

This invention relates to trailer hitches.

Among the objectives of the invention are to provide a trailer hitch for a vehicle and the like which includes means for guiding the trailer tongue into position by engagement with the pivoting means of the trailer hitch; which guiding means is movable out of guiding position into position where it functions as a guard for the rear bumper of a vehicle; which trailer hitch is relatively simple, low in cost and is easily adjusted without the use of tools.

Basically, the trailer hitch-guide and guard disclosed herein comprises a plate which is mounted on the rear of the vehicle. A pivot member such as a ball is fixed to the plate and a pair of guiding members are pivoted to the plate. The guide members are adjustable and may be locked in one of several positions; in one position, the guide members provide guiding surfaces for guiding the trailer tongue toward the pivot ball. In another position, the guiding surfaces extend generally along the rear bumper and serve to guard the rear bumper.

Figure 1:
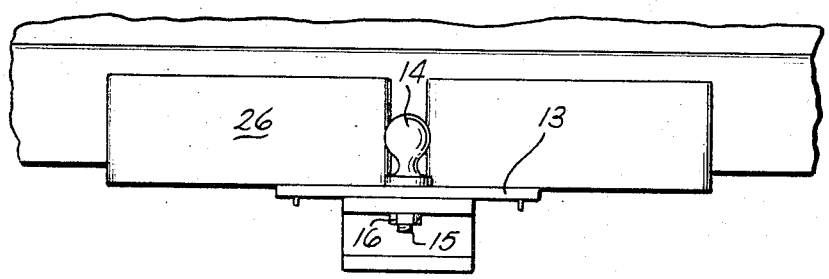
FIG. 1 is a fragmentary rear elevational view of a vehicle having a trailer hitch-guide and guard embodying the invention.

Referring to the drawings, the trailer hitch-guide and guard 10 embodying the invention is adapted to be mounted on the rear of a vehicle 11 adjacent a rear bumper 12 on the vehicle. Specifically, the trailer hitch-guide and guard 10 comprises a generally horizontal plate 13 fixed to the frame of the vehicle in accordance with conventional practice. A pivot member 14 in the form of a ball is mounted on the plate 13 generally centrally of the rear edge by a bolt 15 and nut 16. Plate 13 includes elongated slots 17 which extend on each side of the ball 14 axially of the vehicle. A pivot pin 1 is adjustably mounted along the length of each slot 17 and extends vertically above the slot. Each pivot pin 18 is held in locked position by nut 19 that is threaded onto the lower end of each pivot pin.

A combined guard and guide member 21 is pivoted on each pivot pin 18 and held axially by a nut 18a. Each guide member 21 is adapted to be moved from the position shown in FIG. 2 to one of the plurality of angular positions. Each guide member 21 includes an opening 22 in the flange 23 thereof through which a stop pin 24 extends. The lower end of the pin 24 is adapted to selectively engage one of a plurality of spaced openings 25 in the plate 13 to lock member 21 in one of the positions. Guard member 21 includes a vertical wall 26.

Figure 2:
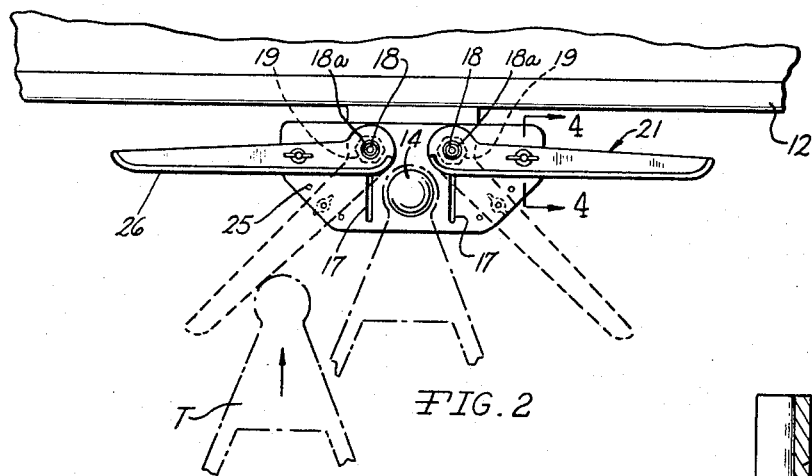
FIG. 2 is a fragmentary plan view of the same.
Figure 3:
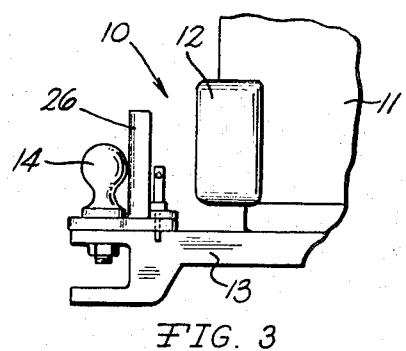
FIG. 3 is a fragmentary side elevational view of the same.
Figure 4:
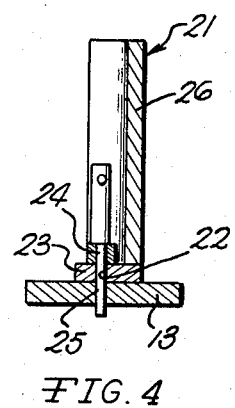
FIG. 4 is a sectional view on an enlarged scale taken along the line 4—4 in FIG. 2.

When the members 21 are in the dotted line position shown in FIG. 2, the walls 26 define vertical guiding surfaces for guiding the trailer tongue T toward the ball 14 as shown in broken lines in FIG. 2.

When the guide members 21 are in position as shown in solid lines in FIG. 2, they extend generally parallel to the rear bumper 12 and function to guard a portion of the rear bumper 12 as well as a portion of the ball 14.

Pivot pins 18 are adjustably mounted along slot 17S to provide sufficient clearance for the switch tongue T when it is engaged with ball 14.

I claim:

1. The combination comprising
   a vehicle,
   a trailer hitch mounted at the rear of said vehicle including a pivot member,
   a pair of movable guard and guide members,
   means for movably mounting each of said last mentioned members from a position wherein a portion of each said member extends at an angle to the rear of the vehicle and provides a guiding surface for guiding the tongue of a trailer tongue toward the pivot member to a second position wherein said guiding surface extends in a direction generally parallel to the rear of the vehicle,
   said means for movably mounting each said guiding member comprising means for pivoting said guide member about a substantially vertical axis,
   means for adjusting the position of said pivot means relative to said pivot member.

2. The combination set forth in claim 1 wherein said last mentioned means comprises a plate supported on a trailer hitch, said plate having an elongated slot therein, each said pivot means being adjustably mounted along said slots.

3. A trailer hitch-guide and guard for a vehicle including a pivot member,
   means for mounting said pivot member on a trailer hitch,
   a pair of movable guard and guide members,
   means for movably mounting each of said last mentioned members adjacent said pivot member on said trailer hitch from a position wherein a portion of each said member extends at an angle to the rear bumper and provides a guiding surface for guiding the tongue of a trailer tongue towards the pivot member to a second position wherein said guiding surface extends in a direction generally along a rear bumper,
   said means for movably mounting each said guiding member comprising means for pivoting said guide member about a substantially vertical axis,
   means for adjusting the position of said pivot means relative to said pivot member.

4. The combination set forth in claim 3 wherein said last mentioned means comprises a plate supported on a trailer hitch, said plate having an elongated slot therein, each said pivot means being adjustably mounted along said slots.

5. The combination comprising
   a vehicle,
   a trailer hitch mounted at the rear of said vehicle including a pivot member,
   a pair of movable guard and guide members,
   means for movably mounting and locking said last mentioned members in a first position wherein a portion of each said member extends at an angle to the rear of the vehicle and provides a guiding surface for guiding the tongue of a trailer tongue toward the pivot member and a second position wherein said guiding surfaces extend in a direction generally parallel to the rear of the vehicle.

6. The combination set forth in claim 5 wherein said means for locking said guiding members in said positions comprises a plate having a plurality of openings therein, a drop pin individually to each said guiding member and adapted to selectively engage said opening in said plate.

7. A trailer hitch-guide and guard for a vehicle including a pivot member, means for mounting said pivot member on a trailer hitch, a pair of movable guard and guide members, means for movably mounting each of said last mentioned members adjacent said pivot member on said trailer hitch in a position wherein a portion of each said member is adapted to extend at an angle to a rear bumper and provides a guiding surface for guiding the tongue of a trailer tongue towards the pivot member and a second position wherein said guiding surface is adapted to extend in a direction generally along a rear bumper.

8. The combination set forth in claim 7 wherein said means for locking said guiding members in said positions comprises a plate having a plurality of openings therein, a drop pin individually to each said guiding member and adapted to selectively engage said opening in said plate.

References Cited

UNITED STATES PATENTS

| 2,409,399 | 10/1946 | Solon | 280—477 |
| 3,077,145 | 2/1963 | King et al. | 280—511 X |
| 3,210,117 | 10/1965 | Hall | 280—500 X |

FOREIGN PATENTS 537,062 10/1931 Germany.

LEO FRIAGLIA, *Primary Examiner.*

U.S. Cl. X.R.

280—511; 293—69